United States Patent [19]

Miyajima

[11] Patent Number: 5,191,188
[45] Date of Patent: Mar. 2, 1993

[54] METHOD OF PREVENTING INTERFERENCE BY A MACHINING HEAD

[75] Inventor: Keiichiro Miyajima, Minamitsuru, Japan

[73] Assignee: Fanuc Ltd., Minamitsuru, Japan

[21] Appl. No.: 778,069

[22] PCT Filed: Apr. 10, 1991

[86] PCT No.: PCT/JP91/00499

§ 371 Date: Dec. 2, 1991

§ 102(e) Date: Dec. 2, 1991

[87] PCT Pub. No.: WO91/16172

PCT Pub. Date: Oct. 31, 1991

[30] Foreign Application Priority Data

Apr. 26, 1990 [JP] Japan .................... 2-111553

[51] Int. Cl.⁵ .................................. B23K 26/02
[52] U.S. Cl. .................... 219/121.83; 219/121.7; 340/463
[58] Field of Search ........... 219/121.7, 121.71, 121.83; 340/463; 364/474.08

[56] References Cited

U.S. PATENT DOCUMENTS

| | | | |
|---|---|---|---|
| 4,109,233 | 8/1978 | Erickson | 340/15 |
| 4,335,296 | 6/1982 | Bredow | 219/121.67 |
| 4,427,873 | 1/1984 | Orita et al. | 219/121.7 |
| 4,698,480 | 10/1987 | Klingel | 219/121.67 |
| 5,021,632 | 6/1991 | Hauert | 219/121.83 |
| 5,047,752 | 9/1991 | Schorn | 340/680 |
| 5,067,086 | 11/1991 | Yamazaki et al. | 364/474.68 |

Primary Examiner—C. L. Albritton
Attorney, Agent, or Firm—Staas & Halsey

[57] ABSTRACT

A machining head interference preventive method for preventing an interference by a punching head and a laser head with work holders of compound equipment designed to perform a punch-pressing and laser machining. Horizontal interference areas wherein the punching head or the laser head will horizontally interfere with the work holders are established, and a vertical interference area wherein the laser head will vertically interfere with the work holders is also provided. When the laser machining mode is selected (S1) and the laser head descends to the vertical interference area wherein it will vertically interfere with the work holders (S2), the position of the laser head is monitored, and if the laser head enters a horizontal interference area (S3), then an alarm is sounded (S4). If the punch-pressing mode is selected, it is determined whether or not the punching head is attempting to enter a horizontally interference are wherein the punching head will horizontally interfere with the work holders (S6), and if the punching head is attempting to enter a horizontal interference area, then the punch-pressing operation is prevented and an alarm is sounded (S7).

2 Claims, 3 Drawing Sheets

METHOD OF PREVENTING INTERFERENCE BY A MACHINING HEAD

TECHNICAL FIELD

The present invention relates to a method of preventing an interference by a machining head with a work holder in compound machining equipment designed to perform punch-pressing and laser machining.

BACKGROUND ART

A punching press is provided with an interference area for protecting a work holder, to thereby prevent an interference by a punching head with the work holder. The punching head is programmed to be properly positioned for machining a work, and the relative position of the work on a table with respect to the punching head is controlled by a computerized numerical control machine which moves the table to reach such a relative position. If the punching head attempts to enter the interference area, then punch-pressing is prevented, and an alarm is sounded.

Recently, however, the number of types of compound machining equipment which combine a punching press and a laser machining unit has increased, as such compound machining equipment combines the advantages of both a punching press and laser machining unit; one setup enables a free selection of punching, ribbing, forming or laser-cutting, and then punching, hollowing out or contour cutting a work to the desired shape. In such compound machining equipment, therefore, it is necessary to prevent interference between the punching head and the work holders during a punch-pressing process, or between a laser head and the work holders during a laser machining process.

DISCLOSURE OF THE INVENTION

The object of the present invention is to provide a method of preventing an interference by a machining head with a work holder, in accordance with the conditions of a punch-pressing process or a laser machining process.

To attain the above object, a machining head interference preventive method is provided for preventing an interference between a punching head and work holders, or between a laser head and work holders in compound equipment designed to perform a punch-pressing and laser machining. In this method, a horizontal interference area wherein the punching head and the laser head would horizontally interfere with the work holder is established, and a vertical interference area wherein the laser head would vertically interfere with said work holder is also established, and accordingly, if the punching head attempts to enter the horizontal interference area, the system prevents the punch-pressing and sounds an alarm, or if the laser head descends into the vertical interference area, and further, enters the horizontal interference area, the system sounds an alarm.

In compound equipment, either a punch-pressing or laser machining is selected. If a punch-pressing is selected, then the system determines whether or not a punching head is attempting to enter a horizontal interference area wherein the punching head will interfere with a work holder. If the punching head is attempting to enter a horizontal interference area, then the system prevents the punch-pressing and sounds an alarm.

When a laser machining is selected, if the laser head descends into the vertical interference area wherein the laser head would vertically interfere with the work holder, then the position of the laser head is monitored, and if the laser head enters a horizontal interference area, an alarm is sounded.

BEST MODE OF CARRYING OUT OF THE INVENTION

An embodiment according to the present invention is described, with reference to the drawings.

Figure 2:
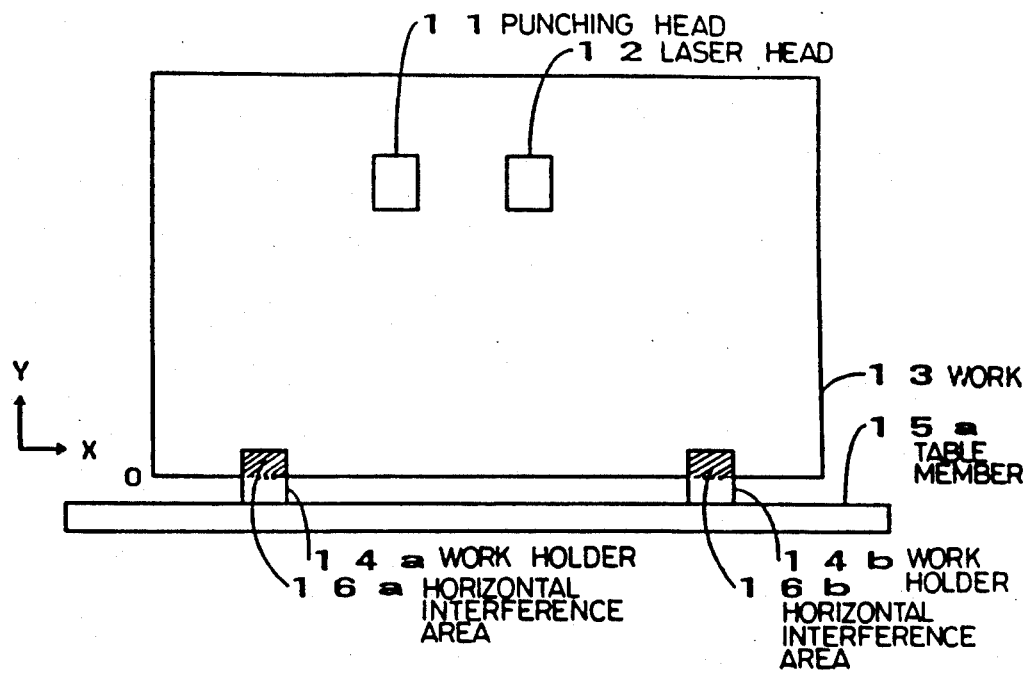
FIG. 2(a) shows an outline of the horizontal positional relationship between the machining heads and the work holders of compound equipment.
FIG. 2(b) shows an outline of the vertical positional relationship between the machining heads and the work holders of the compound equipment.
Figure 2:
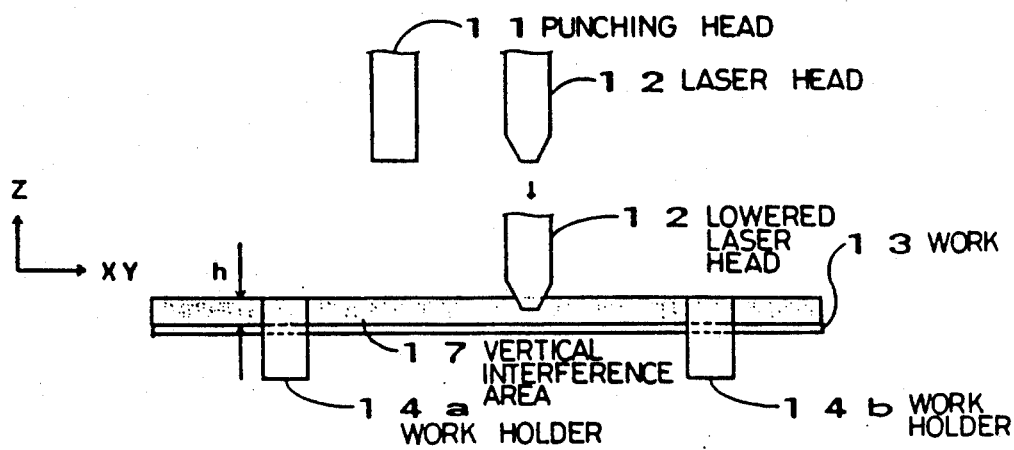

FIG. 2(a) shows the outline of the horizontal positional relationship between the machining heads and the work holders of the compound equipment. In the drawing, a punching head 11 and a laser head 12 punch, rib, form or laser-cut a work 13, work holders 14a and 14b which hold the work 13 are mounted on a table member 15a, and a corner of the work 13 is assigned an origin O of the X- and Y-axes.

In the drawing, areas 16a and 16b are the horizontal interference areas wherein the punching head 11 and the laser head 12 will horizontally interfere with the work holders 14a and 14b. More specifically, the areas wherein the work holders 14a and 14b hold the work 13 are the horizontal interference areas 16a and 16b, shown in the drawing by two hatched areas.

The horizontal interference areas 16a and 16b are determined by the numerical values on the X-axis and the Y-axis from the origin O, and are stored in a memory of the computerized numerical control machine (not shown). Similarly, tool areas for the punching head 11 and the laser head 12 depend on the numerical values on the X- and Y-axes and are stored in the memory of the computerized numerical control machine. The tool areas of the punching head 11 and the laser head 12 are within the horizontal interference areas 16a and 16b. The table (not shown) is moved in accordance with program commands, and the positions of the punching head 11 and the laser head 12 relative to the work 13 on the table are controlled by the computerized numerical control machine.

The punch-pressing mode is selected by a code M of the program, and the system then determines whether or not the punching head 11 will enter the horizontal interference area 16a or 16b. If the punching head 11 attempts to enter the horizontal interference area 16a or 16b, in response to a positioning program command, then the system prevents the punch-pressing operation and sounds an alarm.

FIG. 2(b) shows an outline of the vertical positional relationship between the machining heads and the work holders of the compound equipment. The elements designated by the same symbols as those in FIG. 2(a) are identical elements, and thus an explanation thereof is omitted. In this drawing, the table member 15a is also omitted.

As shown in the drawing, the area wherein the laser head 12 will vertically interfere with the work holders 14a and 14b is a vertical interference area 17. More specifically, the area extends from the surface of the work 13 to a height h of the work holders 14a and 14b, as shown by a hatched area in the drawing. The height h of the work holders 14a and 14b, measured from the surface of the work 13, is stored in the memory of the computerized numerical control machine.

The laser machining mode is selected by a code M of the program, and the monitoring of the position of the laser head 12 is started when the laser head 12 descends to the vertical interference area 17.

Namely, the position of the laser head 12 relative to an entry thereof into the horizontal interference area 16a or 16b is monitored, and if the laser head 12 enters the horizontal interference area 16a or 16b, an alarm is sounded.

Also, if the laser head 12 reaches the horizontal interference area 16a or 16b and then attempts to descend into the vertical interference area 17, the system prohibits this lowering of the laser head 12 and sounds an alarm.

Figure 1:
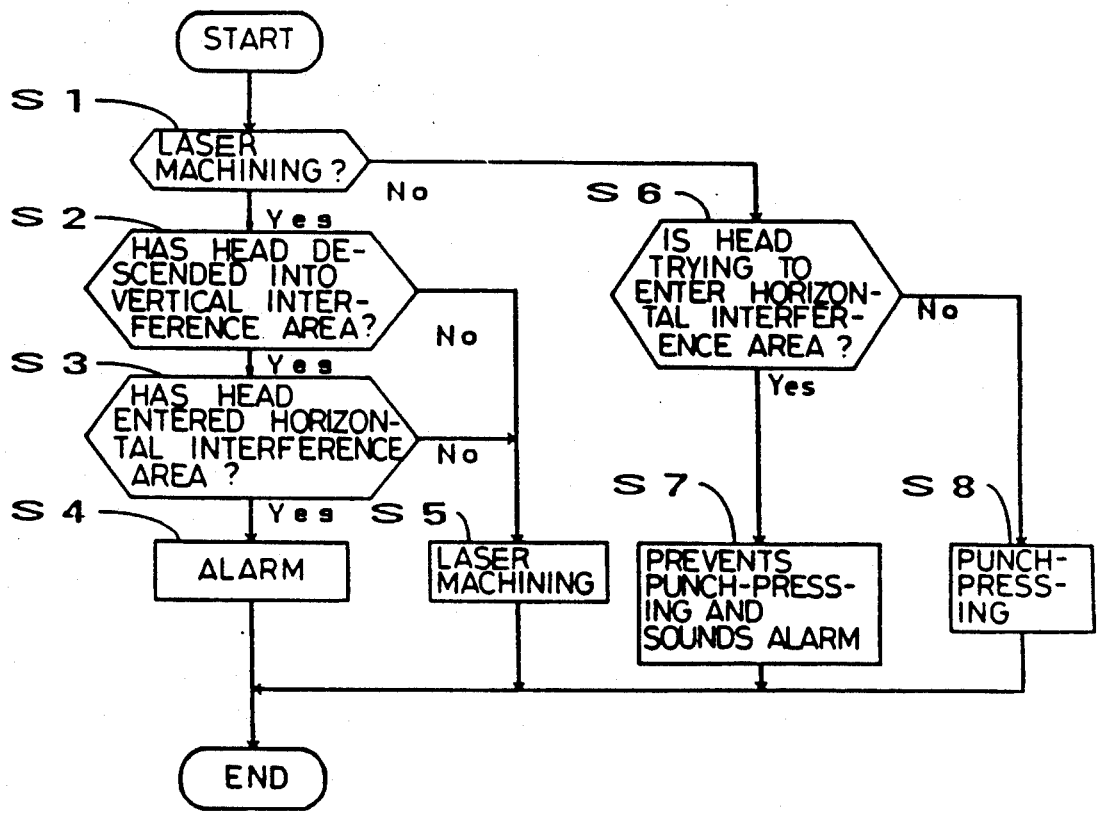
FIG. 1 is a flowchart of the machining head interference preventive method according to the present invention.

FIG. 1 shows a flowchart of the machining head interference preventive method according to the present invention. In the flowchart, a number following S indicates a step number.

[S1] Either the punch-pressing mode or the laser machining mode is selected by a code M of the program. If the laser machining mode is selected, then the program goes to S2, and if the punch-pressing mode is selected, the program goes to S6.

[S2] The system determines whether or not the laser head 12 has descended into the vertical interference area, and if so, the program goes to S3; and if not, the program goes to S5.

[S3] The system monitors the laser head 12 to determine whether or not it has entered the horizontal interference area, and if so, the program goes to S4; and if not, the program goes to S5.

[S4] The system sounds an alarm regarding the position of the laser head 12.

[S5] The system performs the laser machining.

[S6] The system determines whether or not the punching head 11 is trying to enter a horizontal interference area, and if so, the program goes to S7; if not, the program goes to S8.

[S7] The system prohibits a punch-pressing by the punching head 11, and sounds an alarm.

[S8] The system carries out punch-pressing.

Figure 3:
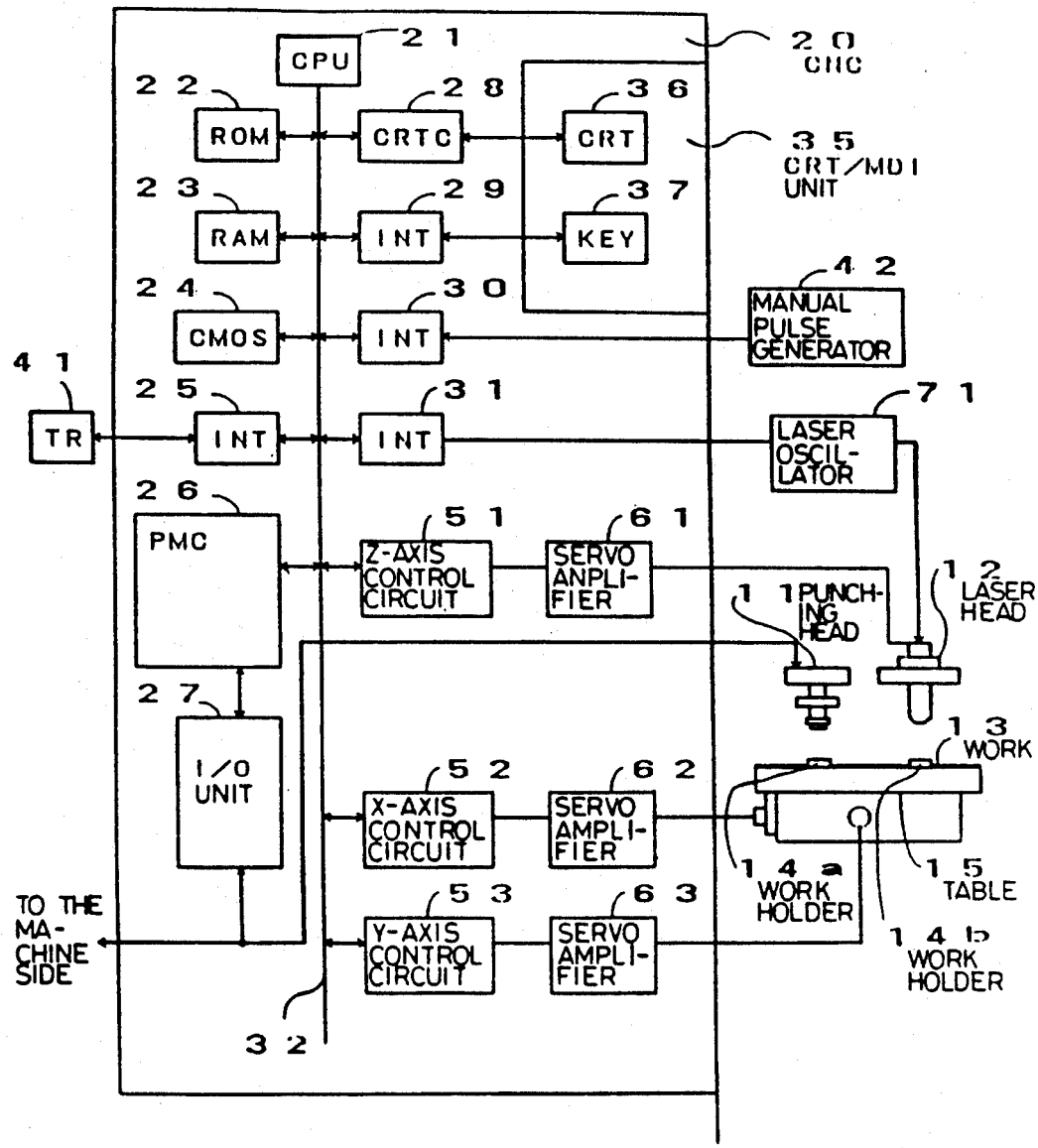
FIG. 3 is a block diagram of hardware of a computerized numerical control machine (CNC) for implementing the present invention.

FIG. 3 is a block diagram of the hardware of the computerized numerical control machine (CNC) for implementing the present invention. In the drawing, 20 denotes the computerized numerical control machine (CNC). A processor 21 is the central processor for controlling the whole computerized numerical control machine (CNC) 20, and reads a system program stored in a ROM 22 through a bus 32, to thereby control the whole computerized numerical control machine (CNC) 20 in accordance with the system program. Temporary calculation data, display data, etc. are stored in a RAM 23, for which a SRAM is used. A CMOS 24 stores a tool correction amount, the tool area of the punching head 11, the tool area of the laser head 12, the horizontal interference areas 16a and 16b of the punching head 11 and the laser head 12, the vertical interference area 17 of the laser head 12, pitch error correction amounts, machining programs, and machining parameters, etc. The CMOS 24, backed up by a battery not shown in the drawing, is a nonvolatile memory, and thus retains such data even when the power of the computerized numerical control machine (CNC) 20 is turned OFF.

An interface 25 used for external equipment is connected to external equipment 41 such as a paper tape reader, paper tape puncher and paper tape reader puncher. A machining program is read from a paper tape reader. Also, a machining program which has been edited in the computerized numerical control machine (CNC) 20 can be output to a paper tape puncher.

A PMC (Programmable Machine Controller) 26 is built into the CNC 20, and controls a machine in accordance with a sequence program created in the ladder format. More specifically, in accordance with a function M, function S or function T specified by the machining program, data is converted to signals necessary for the machine by the sequence program, before being output from an I/O unit 27 to the machine. The output signals drive magnets or the like of the machine, to thus activate hydraulic valves, pneumatic valves, electric actuators, the punching head 11, etc. Further, the necessary processing is performed in response to signals from limit switches of the machine or from switches and the like on the machine control panel, and the processed information then sent to the processor 21.

A graphic control circuit 28 converts digital data on the present position, alarm, parameters, and image data, etc. into image signals, and outputs the obtained image signals. The image signals are sent to and indicated on a display device 36 of a CRT/MDI unit 35. An interface 29 receives data from a keyboard 37 provided in the CRT/MDI unit 35, and sends this data to the processor 21.

An interface 30 is connected to and receives pulses from a manual pulse generator 42. The manual pulse generator 42 is mounted on the machine control panel and is used for an accurate manual positioning of machine operating sections.

Axis control circuits 51 through 53 receive commands for moving the individual axes, from the processor 21, and output these commands for moving the individual axes to servo amplifiers 61 through 63. Namely, the servo amplifier 61 receives a moving command from the Z-axis control circuit 51, and moves the laser head 12 in the direction of the Z-axis; and the servo amplifier 62 receives a moving command from the X-axis control circuit 52, and moves the table 15 in the direction of the X-axis, and the servo amplifier 63 receives a moving command from the Y-axis control circuit 53, and moves the table 15 in the direction of the Y axis.

As described above, according to the present invention, horizontal interference areas and a vertical interference area of the machining heads of compound equipment are provided, and a punch-pressing is prevented and an alarm sounded if the punching head attempts to enter a horizontal interference area. Also, if the laser head descends into the vertical interference area and enters a horizontal interference area, an alarm is sounded. Therefore, different types of machining heads can be prevented from interfering with the work holders in compound equipment.

I claim:

1. A method of preventing an interference between a punching head and work holders, or between a laser head and said work holders of compound equipment designed for punch-pressing and laser machining, comprising:
- horizontal interference areas wherein said punching head or said laser head will horizontally interfere with said work holders,
- a vertical interference area wherein said laser head will vertically interfere with said work holders,
- means for preventing punch-pressing and sounding an alarm, when said punching head attempts to enter said horizontal interference area, and
- means for sounding an alarm if said laser head descends into said vertical interference area and further enters said horizontal interference area.

2. The method of preventing an interference by a machining head according to claim 1, in which when said laser head enters said horizontal interference area and further attempts to descend into said vertical interference area, such an attempted of said laser head unit into said vertical interference area is prevented and an alarm is sounded.

* * * * *